W. GILMAN.
SEED-PLANTING MACHINERY.

No. 190,486.            Patented May 8, 1877.

Witnesses:
Edward O. Brown
O. L. Parrish

Inventor:
William Gilman

UNITED STATES PATENT OFFICE.

WILLIAM GILMAN, OF CHICAGO, ILLINOIS.

IMPROVEMENT IN SEED-PLANTING MACHINERY.

Specification forming part of Letters Patent No. 190,486, dated May 8, 1877; application filed March 8, 1877.

*To all whom it may concern:*

Be it known that I, WILLIAM GILMAN, of the city of Chicago, in the county of Cook and State of Illinois, have invented a new and useful Improvement in Seed-Planting Machinery, which improvement is fully set forth in the following specification, reference being had to the accompanying drawings.

The object of my invention is to automatically drop the hills of seed in check-rows, without any previous marking of the ground to be planted, by securing my attachment to any ordinary horse-power planter in use, and is illustrated in detail by reference to the drawings, of which—

Figure 1:
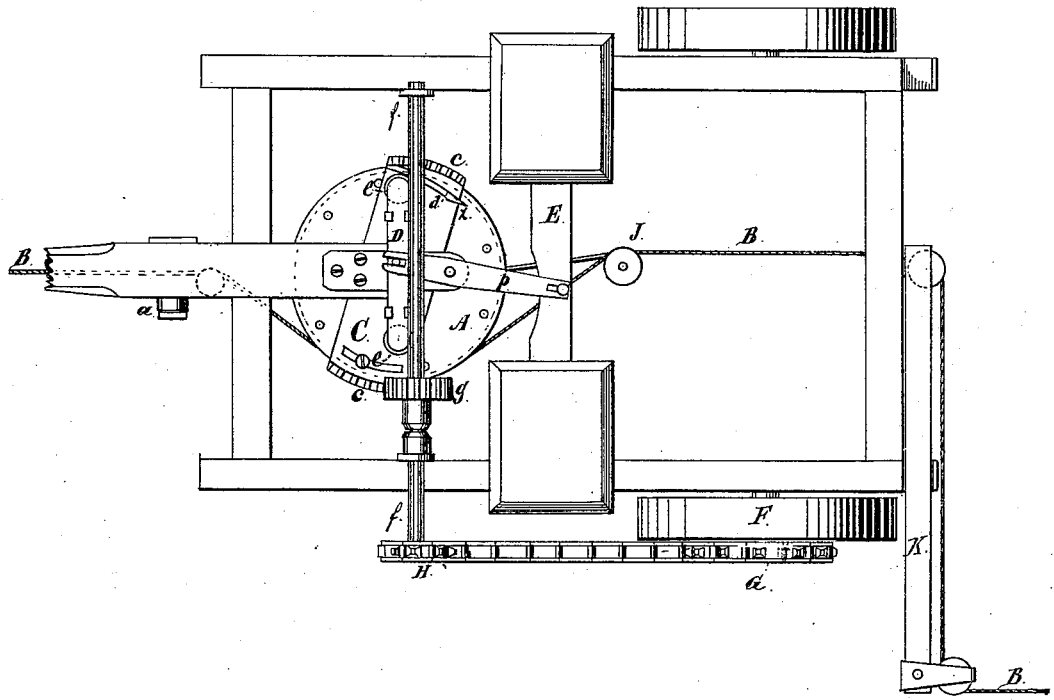
Figure 2:
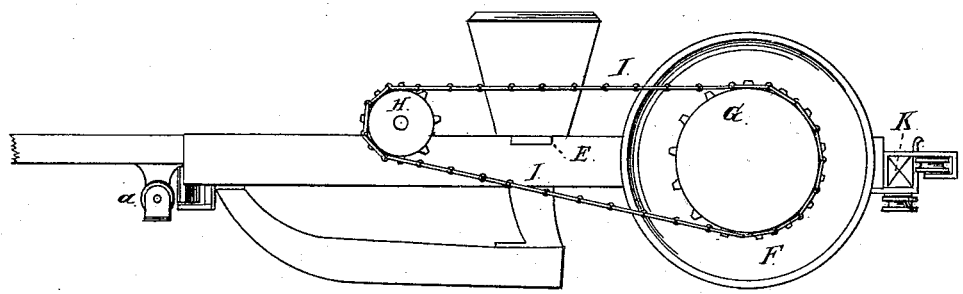

Figure 1 represents a top view of a planter with the improvement attached; Fig. 2, a side view, and Fig. 3 a sectional view of a portion of the improvement.

A grooved pulley or wheel (represented in the drawings at A, Fig. 1) is placed under the frame-work of the planter, one-half the circumference of said wheel being equal to the distance between the hills to be planted, said pulley or wheel A being driven in the proper direction by a rope, B, or its equivalent, Fig. 1, which is stretched across the field to be planted, running over carrier-pulley $a$, passing around or partially around said wheel A, passing over pulley on carrier-bar K, substantially as shown in the drawing, and is then securely fastened to the ground in the rear of the planter. Two segments of gearing, $c$ $c$, have a common center with said wheel A, connected by a bar, C, which is attached to said wheel A in such a manner as to be adjusted at pleasure, and held by proper device upon any desired location on said wheel A, in order to regulate or vary the point of dropping the hill. A cam, $d$, by coming in contact alternately with pulleys $e$ $e$ on slide-bar D, imparts the necessary motion to the seed-bar of the planter by means of connecting-bar $p$, or other proper device. A continuation of the cam $d$ is formed by an arc of a circle, $x$, having the same center of said segments $c$ $c$, and of sufficient length to hold the pulleys $e$ $e$ in position after the stroke, and prevent any rebound of the machinery.

To one of the wheels of the planter F, Fig. 2, is attached a sprocket-wheel, G, which, by means of chain-belt I and sprocket-wheel H, imparts motion to the shaft $f$, Fig. 1, and the bevel-gear wheel $g$ on said shaft. Said sprocket-wheels G H and bevel-gear $g$ are so proportioned in size as to cause the circumference of said bevel-wheel $g$ to move with at least as great speed as that of the segments carried by said wheel A, which is moved by the passage of said rope B.

When, by means of the motion imparted by said rope, the cam $d$ is about to come in contact with one of the pulleys $e$, the bevel-wheel $g$ comes in gear with the segment-gearing $c$, which moves the bar C while the cam $d$ is doing the work required of it, by which means the power required for operating the seed-dropping machinery is supplied by the positive gearing from the wheel, which is turned by contact with the ground, thus relieving the rope from any and all strain, except that required in turning the wheel A, which requires but little power, and is uniform at all times. This arrangement readily overcomes any temporary obstruction which the machinery may encounter, and renders the improvement equally successful when applied to any planter, without regard to the amount of power required to operate its machinery.

Figure 3:
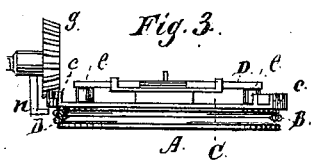

A support or rest, $n$, Fig. 3, is provided, upon which the segments $c$ $c$ respectively rest while they are in contact with the bevel-wheel $g$, to keep said segments up to their place, and to prevent any extra pressure upon the wheel A or its bearings.

A stress-pulley, J, which is controlled by spring or other proper device to impart to it the proper uniform force, presses against said rope B after it leaves the wheel A, to prevent any change in the tension of said rope caused by any lateral motion of the tongue of the planter or otherwise.

I claim as my invention—

1. The combination of the rope stretched across the field, to determine, by its action upon the machine, the points at which the seed is to be dropped, with the operating machinery, substantially as described, or its equivalent, for dropping the seed at said points by means of power derived from a traction-wheel running upon the ground, substantially as described.

2. The combination of the connected segments $c\ c$, pulley-wheel A, and bevel-wheel $g$ with the cam $d$, to operate the dropping machinery, substantially as shown and described.

3. The combination of the wheel A, revolved by the passage of the rope B, with the segments and bar C, for the purpose of carrying said segments $c\ c$ to and in contact with the bevel-wheel $g$, substantially as shown and described.

4. The combination of the sprocketed wheels G H, chain-belt I, and bevel-wheel $g$ with pulley A and segmental gears $c\ c$, for operating the seed-dropping mechanism of the planter, substantially as shown and described.

5. The combination of the stress-pulley J and spring, or equivalent device, with the check-row cord, the pulley having segmental gears, and driving-pinion $g$, substantially as shown and described.

WILLIAM GILMAN.

Witnesses:
EDWARD O. BROWN,
O. L. PARRISH.